United States Patent Office 3,528,288
Patented Sept. 15, 1970

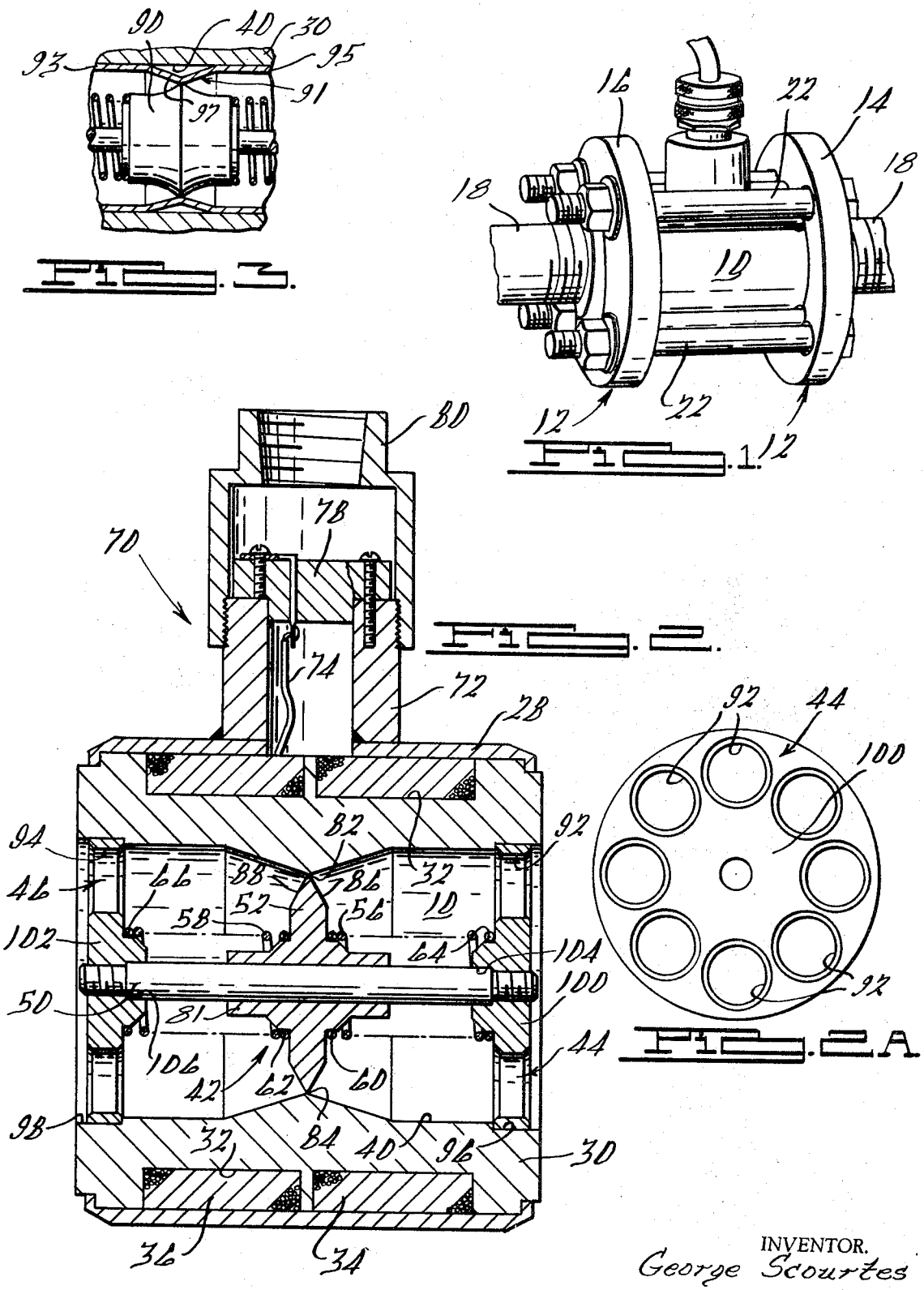

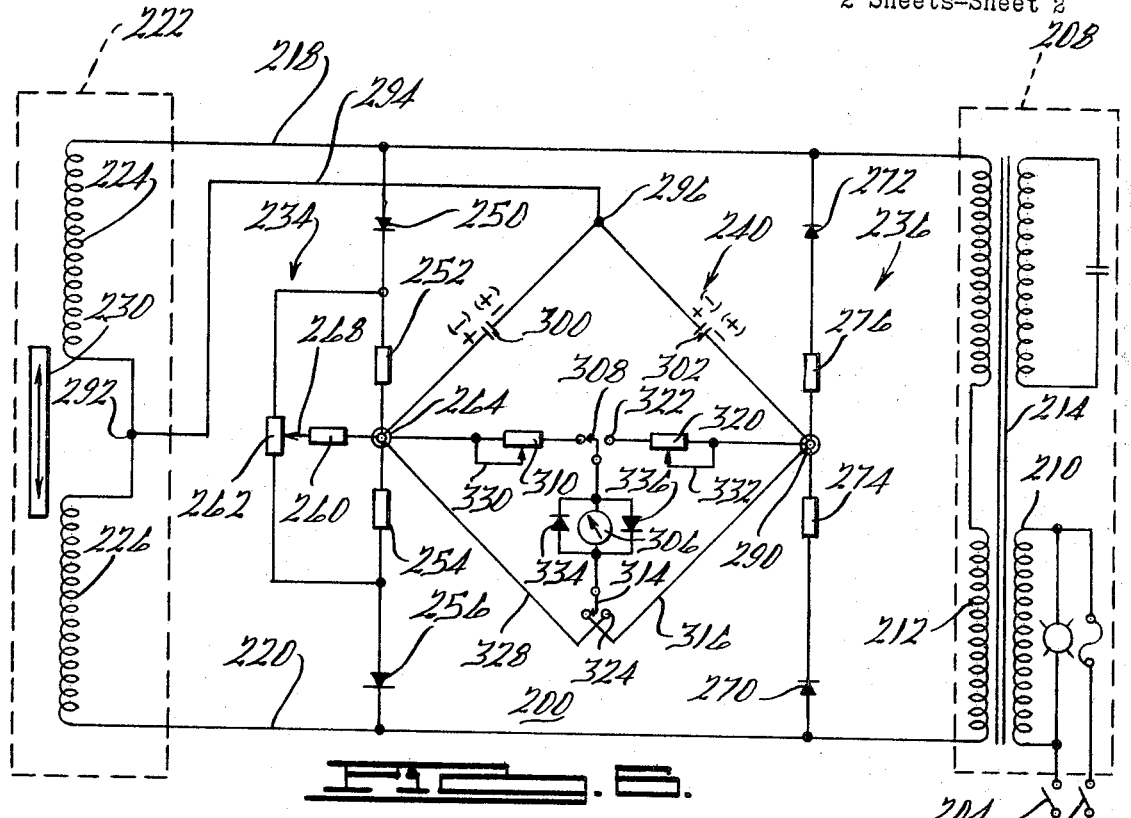
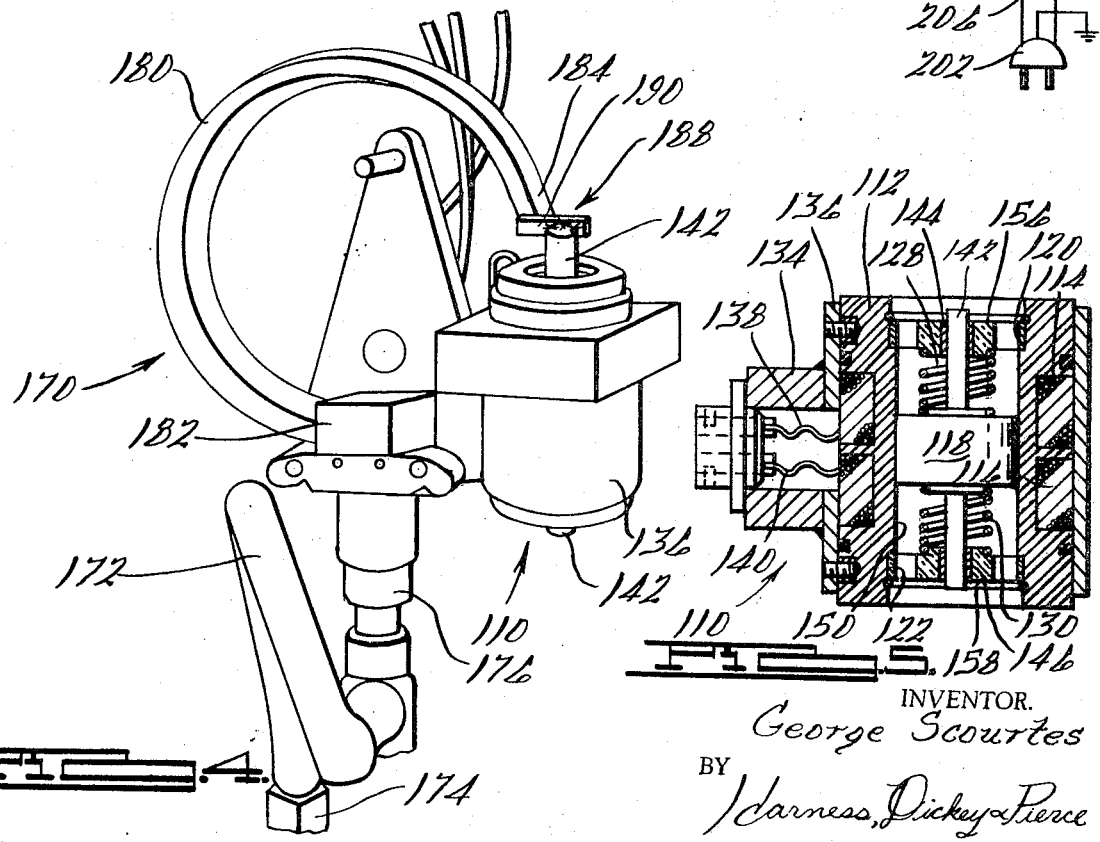

3,528,288
FLUID FLOW TRANSDUCER SYSTEM
George Scourtes, Detroit, Mich., assignor to Cox Instruments Division, Lynch Corporation, Detroit, Mich., a corporation of Indiana
Filed Oct. 8, 1965, Ser. No. 494,164
Int. Cl. G01f 1/00
U.S. Cl. 73—207
10 Claims

ABSTRACT OF THE DISCLOSURE

A transducer assembly for indicating the rate of flow of a fluid in a pressure line including a magnetic armature which is centrally located by means of centering springs within a bore, the bore being connected in fluid communication with the pressure line by means of a coupling assembly.

The variation in position of the bore due to changes in the characteristics of the fluid within the pressure line are sensed by means of variations in a magnetic circuit including a pair of differentially coacting coils and the armature. The circuit includes a capacitance bridge network which is interconnected to provide a multiplication of the output signal due to variations in positioning of the armature member.

---

This invention generally relates to new and useful improvements in telemetering systems, and more specifically to improvements in a transmitting transducer device for changing rate of flow or pressure into a signal and further to improvements in an electrical indicating system for producing an output signal in accordance with the relative movement of an element in a transducer device.

Fluid flow or pressure responsive telemetering systems of the type to which the present invention is generally directed, have come into greater widespread use due to increased tolerance requirements in fluid flow or pressure devices, thus increasing the need for highly accurate telemetering systems over a wide range of flows or pressures. Such systems have equal applicability to the flows or liquids or gases or pressures caused by the pumping of the liquids or gases.

A similar need has risen in the area of bidirectional flow or pressure meters wherein the peak amplitude of fluid flows or pressures in both directions may be accurately measured and indicated. One such need for a bidirectional telemetering system, including a bidirectional transmitting transducer, involves the situation of a hydraulic pump and hydraulic motor combination wherein fluid is pumped into and out of the line by means of a piston. With the unidirectional metering systems of the prior art, it has become necessary to convert the motor shaft rotation into a consistent hydraulic flow, in one direction, by means of a valving apparatus. Thus, an auxiliary line must be provided for use in conjunction with the telemetering system, thereby precluding the use of the teletmetering system directly in the pumping line.

Accordingly, it is one object of the present invention to provide a new and improved telemetering system for indicating the rate of flow of a fluid or the pressure of a fluid.

It is a further object of the present invention to provide an improved telemetering system which is responsive to a wide range of flows or pressures.

It is still a further object of the present invention to provide an improved telemetering system which is bidirectionally responsive by merely reversing a switch.

It is still a further object of the present invention to provide an improved transducer device for a telemetering system which is automatically responsive to fluid flows in both directions and is responsive to pressure, both positive and negative in the latter case vacuum.

It is another object of the present invention to provide an improved telemetering system which may be adapted to provide an output in response to fluid flows or pressures which is a function of flow or pressure, as for example a logarithmic, linear, or squared output.

It is still a further object of the present invention to provide an improved telemetering system having a transducer device which is free from any rotating parts, such as wheels, or moving ball bearings.

A further object of the present invention is to provide an improved transducer mechanism for producing an electrical output signal in accordance with either the amplitude variations of a bidirectional flow or pressure or is capable of producing an output signal in accordance with a fluid flow or pressure in either direction.

It is still a further object of the present invention to provide an improved transducer device for converting fluid flow or pressure to an electrical signal which is capable of measuring flow substantially down to zero and up to a very large flow or pressure.

It is still a further object of the present invention to provide a simplified variable orifice, bidirectional transducer device which is capable of converting fluid flow or pressure to an electrical signal.

It is still another object of the present invention to provide an improved transducer device for converting fluid flow or pressure into an electrical signal, the transducer device being simple to mount directly in the fluid flow line or directly on a pressure responsive transducer.

It is still a further object of the present invention to provide an improved transducer device for converting fluid flow or pressure to an electrical signal which is effectively centered by means which varies its force in a substantially linear relationship with the amount of deflection of an armature member.

It is still a further object of the present invention to provide an improved fluid flow or pressure to an electrical signal converter transducer device which is simple to assemble and extremely accurately radially centered within the bore of the transducer device.

It is still a further object of the present invention to provide an improved indicator system.

It is another object of the present invention to provide an improved indicator system which may be rendered bidirectional by merely actuating a switch.

It is still a further object of the present invention to provide an improved indicator system utilizing a voltage doubler rectifier and incorporating substantially no amplification elements therein.

It is still a further object of the present invention to provide an improved indicating system wherein a plurality of reference potentials and a plurality of position sensitive coils are fed from the same source of electrical energy.

It is still a further object of the present invention to provide an improved indicating system wherein is provided a simplified reference voltage zeroing network and a span adjust network, the system further being provided with a second simplified span adjust network for flows in the opposite direction or pressures in the opposite direction from those indicated by said first circuit.

It is still a further object of the present invention to provide an improved indicating system wherein the difference in voltage between a change in voltage level of each of a plurality of position sensitive coils and a reference level is fed to a voltage doubling circuit.

It is still another object of the present invention to provide an improved indicator system wherein signal drift in response to change in electrical characteristics of the system due to temperature changes and the like, are substantially eliminated.

It is still a further object of the present invention to provide an improved telemetering system which is inexpensive to manufacture, reliable in use and substantially impervious to harmful effects caused by the fluid reacting on the transducer element.

Further objects, features and advantages of this invention will become apparent from a consideration of the following drawings wherein:

FIG. 1 is a perspective view illustrating the improved transducer device installed in flow sensing relation with a fluid carrying conduit;

FIG. 2 is a cross-sectional view of the transducer device of FIG. 1, with the mounting means removed and illustrating the interior portion of the transducer device;

FIG. 2a is an elevational view of the diffuser member of FIG. 2;

FIG. 3 is an elevational view of a modified form of the bore and armature member of FIG. 2;

FIG. 4 is a perspective view illustrating a pressure responsive transducer device incorporating certain principles of the present invention;

FIG. 5 is a cross-sectional view of a further pressure responsive transducer device and illustrating the interior features thereof; and FIG. 6 is a schematic diagram of an indicating system incorporating certain other principles of the invention, the indicating system being capable of being utilized with any form of transducer device, including those illustrated in FIGS. 1 to 5.

Referring now to the drawings, and particularly to FIGS. 1 and 2, a telemetering system incorporating the principles of the present invention is illustrated wherein a flow or pressure transmitting transducer 10 may be incorporated directly into the line by means of a coupling mechanism 12. The coupling mechanism 12 generally comprises a pair of concentrically counterbored plates 14, 16 which are positioned on each end of the flow or pressure line 18 in face-opposing relation with each other, whereby the counterbored portions are in axial alignment with the axis of the pressure or fluid flow lines 18. The two face-opposing, counterbored end plate members 12 provide a space into which the transducer device 10 may be inserted. Each of the end plates 14, 16 and each end of the transducer device 10 have a pair of mating faces formed thereon which are capable of being brought into sealing engagement with each other through suitable gasket means disposed between the opposing faces. Thus, a leakproof seal is provided between the fluid flow line 18 and the transducer device 10. A plurality of fastener members 22, representatively illustrated as nut-bolt assemblies, are provided on the outer periphery of each of the end plate members 14, 16 whereby the tightening of the fastener assemblies 22 brings the mating faces into sealing engagement with each other. It is to be understood that the opposing faces of plates 14, 16 may be made relatively flat, without a counterbored portion, and the bolts 22 utilized to center the transducer 10 on the plates 14, 16. Similarly, other forms of connection to the line 18, as will be discussed in conjunction with the detailed description of FIG. 2, may be utilized in connecting the transducer 10 to the pressurized line 18.

The transducer assembly itself generally comprises an outer housing or shroud member 28 formed of magnetic material, which is adapted to surround a nonmagnetic body portion 30 having a pair of peripheral grooves 32 formed therein which are adapted to receive a pair of circularly induction wound coils 34, 36. The interior of the body portion 30 is formed with a bore 40 which is adapted to receive an armature assembly 42 therein. The armature assembly 42 generally comprises a pair of end members 44, 46 which are suitably positioned at either end of the body portion and serve as diffusers to break up any flow pattern which may be present in the flow of fluid through the fluid line 18. The two diffusers 44, 46 or end members may be formed of magnetic or nonmagnetic material and are interconnected by a nonmagnetic shaft member 50 having an armature member 52 slidably retained thereon. The armature member 52 is positioned in the axial center of the bore 40 by a pair of opposing spring members 56, 58 which are adapted to engage the armature member 52 at one end thereof and the diffuser members 44, 46 at the respective other ends. The armature member 52 is formed with a pair of peripheral guide portions or pilots 60, 62 as are the diffuser members formed with like circumferential guide portions or pilots 64, 66 to suitably support the spring members 56, 58. Thus the armature member 52 is effectively centered on the shaft 50 between the two diffusers 44, 46 and is capable of being slidably displaced on the shaft, in one direction or the other, by means of fluid flowing in one or the other direction. It will be noted that the spring members 56, 58 are positioned between the end member 100 and armature 52, and armature 52 and end member 102 such that the effective forces of the springs are opposing each other to increase the effective spring rate of the combination of springs 56, 58. For example, in linear springs having equal rates, the effective spring rate of the combination fo springs 56, 58 is doubled. The initial force or preload on the armature at zero flow or pressure conditions is essentially zero, Thus, the range of the transduced device is greatly increased over conventional transducers.

The shroud member 28 is provided with a nipple assembly 70 which is adapted to house a plurality of connections to the coils formed in the grooves of the body member. The nipple assembly generally includes an annular shaped body portion 72 which may be integrally formed or cast with the shroud member 28 or suitably attached thereto, as by welding. The interior of the body portion 72 is in communication with the grooves 32 formed in the body member 30, thereby facilitating the positioning of a pair of leads 72 therein. A support member 78 is attached to the body portion 72, as by screws to form terminals for the leads 74. A connector member 80 is threaded or otherwise fastened to the body portion and provides protection for the cable connection to a suitable electrical indicating apparatus. The coils 34, 36 are normally in series, whereby the magnetic flux produced by energization of the coils 34, 36 will flow through the body member 30, through the magnetic armature member 52 to the diffuser member 44 in the case of magnetic diffuser 44, and back to the respective end of the magnetic shroud member 28.

As stated above, diffuser members 44, 46 may be chosen to be fabricated of magnetic or nonmagnetic material. In the case where the diffuser is formed of magnetic material, the flux path from the coils 34, 36 will be through the diffuser members 44, 46 as a low reluctance path. In this situation, the movement of the armature member varies the reluctance of the flux path approximately as a square function of the position of the armature. However, in the case where the end members 44, 46 are formed of nonmagnetic material, the output signal from coils 34, 36 will vary as a linear function of the position of the armature 52. In this latter case, the flux path will be through the radial gap between the hub end of the armature member and the body portion 30.

It is to be noted that the movement of the armature member 52 on the shaft 50 due to the increase or decrease of flow through the bore 40 will increase or decrease the gap between the armature member 52 and the respective diffuser or end member 44 thereby increasing or decreasing the reluctance of the magnetic path for the flux produced by the coil. The second coil 36 has a similar path through the left portion of the shroud member 28, the body member 30 at the left portion thereof, the diffuser member 46 in the case of a magnetic diffuser, the variable air gap to the armature member and back to the shroud member. In the case where the diffuser is nonmagnetic, the flux path will be through the gap between the hub 81 of the armature member 52, as described above. It is to be noted that the change in air gap due to the movement of the armature member in one direction, will increase the reluctance of one of the coils while at the same time decreasing the reluctance of the flux path of the other coil. Thus the impedance of one coil is increased linearly while the impedance of the opposite coil is decreased linearly by a corresponding amount.

The interior of the bore has been formed with a constricted flow area portion 82 which is in mating engagement with a circular knife edge 84 formed on the armature member 52. At zero flow, the armature is effectively centered with the knife edge 84 on the armature contiguous to the reduced flow area portion 82 of the bore. The knife edge on the armature member is formed by removing portions of the body of the armature member in a particular configuration or by molding the bore 40 in the desired configuration. In the representative example illustrated, the bore is shown to be decreasing linearly, however, it is to be understood that any configuration may be utilized to produce a desired output.

For example, an exponential curve or an exponentially decreasing and increasing flow area will react with the flow to produce an output in the indicating system which is substantially linear. On the other hand if a linear decreasing and increasing flow area is utilized, the output at the indicating device will be substantially logarithmic. Also, in the event a smooth bore is utilized, the output will vary as a square function of the flow. Similarly, the armature member has material removed from an outer portion thereof to form the knife edge 82, and this material may be removed in a plurality of configurations. For example, the surfaces 86, 88 may be formed in a straight or linear configuration, as illustrated in FIG. 2 of the drawings, or an exponential configuration, as illustrated in the modified form 90 of the armature shown in FIG. 3. Thus with an increase of flow, the flow orifice through which the fluid is flowing will vary in either a linear or exponential fashion to produce a logarithmic or linear output, respectively, or as a square output in the case of a smooth bore. The configuration of both the armature member and the bore is symmetrical about the zero flow point thereby providing a bidirectional indicating device. The flow in one direction will enter the transducer from the right through the apertures 92 formed in the diffuser 44 to impinge on the right face of the armature 52. The flow then travels through the remainder of the bore 40 after moving the armature 52 to the left, and exits from the transducer 10 through apertures 94 formed in the diffuser 46.

Referring specifically to FIG. 3, it is seen that the bore 40 is formed as a smooth cylinder and a variable orifice means 91 inserted therein having a pair of elongated portions 93, 95 which are adapted to closely fit the interior diameter of the bore 40 to retain the member 91 therein. A central portion is formed with a flow constricting swagged portionn 97 to vary the deflection of the armature 90 in accordance with a particular function of flow.

In FIG. 2, armature member assembly 42 is accurately radially positioned in the bore 40 by means of an annular, inwardly facing pair of counterbores 96, 98 formed on the inner surface of the body member 30. The counterbores 96, 98 are accurately formed concentrically with respect to the axis of the bore thus positioning the center of the diffusers 44, 46 on the axis of the bore. The diffusers 44, 46 include a central hub portion 100, 102 which are formed with counterbored apertures 104, 106 concentric with the outer periphery of the diffusers 44, 46. The inside diameter of the apertures 104, 106 closely approximate the outside diameter of the shaft 50 thereby forming a close fit therebetween. The hub portions 100, 102 are provided with internally threaded bores which are adapted to threadedly engage mating threaded ends of the shaft 50.

In assembling the armature assembly 42, one diffuser is threaded on the shaft 50 and the first spring, the armature and then the second spring are successively placed on the shaft 50 in the order shown and described. The armature assembly thus formed is then inserted into the bore from one end and the remaining diffuser is threaded onto the shaft from the other end of the bore 40. The diffuser is continuously threaded until the diffusers are inserted into the counterbores 96, 98 and in binding engagement with the shoulders formed in the bore 40. The binding force is sufficient to retain the armature assembly 42 in the bore 40.

As stated above, the mounting assembly 12 may take other forms suitable for use in pressurized lines, such as line 18. One such form includes removing the diffuser members 44, 46 from the counterbored portions 96, 98 and forming interior threads on counterbores 96, 98. An elongated diffuser nipple member formed of solid cylindrical, or stepped stock, is then threaded into portions 96, 98 by means of exterior threads formed therein, and a portion of the diffusers may project beyond the body member 30. The diffuser nipples may then be counterbored at the exterior ends thereof and threaded to receive the threaded end of the pipe 18 and a diffuser may be formed by drilling through the portion of the nipple which has not been counterbored. Thus the pipe, diffusers and bore 40 are properly aligned. A second modification may take the form of a flange fitting wherein a solid stock is similarly formed in a nipple fitting, as described above. For example, a solid, stepped generally cylindrical stock has a first end threaded on an exterior surface thereof to threadedly engage mating threads formed on the interior of portions 96, 98. The portion of the cylinder adjacent the threaded portion may have a larger exterior diameter than the threaded portion and is adapted to slidably receive a radially extending flange member thereon. The outer end of the nipple is formed with a still larger diameter portion to retain the flange on the nipple and the flange may be counterbored to receive the head portion. The head portion is adapted to coact with the body portion to retain the flange in position and also to provide strength to the flange member when it is mated with a second flange member on the pressurized pipe. The threads on the interior surface of the counterbored portion are omitted in this situation due to the fact that the end of the pipe is not threaded.

As stated above, the invention incorporated herein is not restricted to flow type of transducer devices but also may be made to include pressure responsive transducers including systems wherein a means is provided for transforming pressure into linear movement, the linear movement being connected to a second transducer device which is capable of transforming the mechanical movement into an electrical signal. In one form, the general configuration of the first transducer may take the form of a Bourdon tube, or any form of pressure responsive device, and the second transducer may take a form which is substantially identical to that described in conjunction with the flow type of transducer. However, in pressure responsive type transducer, the armature member may be fixed relative to a shaft, the shaft being slidably mounted in a pair of end members which are suitably mounted in the bore in either end of the body member and concentric with the bore, or may be slidably mounted on a fixed shaft, as described in conjunction with FIG. 1.

Referring now to FIGS. 4 and 5, there is illustrated one preferred embodiment of a pressure responsive transducer assembly 110 which may be utilized with the indicator system illustrated in FIG. 6. Referring first to FIG. 5 and as described in conjunction with the flow situation, a body member 112 is provided with a pair of concentrically wound coils 114, 116 which set up a pair of flux paths through an armature member 118 and end members 120, 122 whereby the movement of the armature member increases the reluctance of one path and decreases the reluctance of the opposite path, as was the case with the fluid responsive transducer assembly 10. It is to be noted that end members 120, 122 may be formed of magnetic or nonmagnetic material in accordance with the desired output results. Accordingly, the impedance of the above mentioned coils is varied in accordance with the position of the armature within the bore. A pair of opposing centering springs 128, 130 are provided to initially position the armature within the bore, thus zeroing the armature 118 within the transducer device 110.

The output of the transducer device is fed through a nipple assembly 134 attached to the outer periphery of a shroud member 136 and includes a plurality of conductors 138, 140 in electrical communication with the coils 114, 116 formed in the body member 112. The induction coils 114, 116 are connected in series across a suitable source of alternating current potential and the voltage drop across each of the coils varies in accordance with the change of reluctance of the respective magnetic paths due to the change in position of the armature member in the bore of the body in response to a variation in pressure. Accordingly, for any given voltage drop or voltage supplied to the coils, the total voltage drop will be proportioned across each of the coils in accordance with the reluctance of the respective magnetic paths thereby providing an indication of the relative position of the armature member within the bore.

In the modification illustrated in FIG. 5, the armature 18 is slidably supported relative to a shaft 142 and the shaft is relatively fixed with respect to the end members 120, 122. A cylindrical portion of friction material may be positioned to form retaining members 114, 116, to facilitate the assembly of shaft 142 within end members 120, 122 or end members 120, 122 may be threadedly fixed to the shaft 142, as in the case of FIG. 2. The end members are radially positioned within the bore 150 of the body member 112 by means of concentric grooves 152, 154 formed therein as described in conjunction with FIGS. 1 to 3. The end members 120, 122 are fixed in the grooves by suitable snap-rings 156, 158 or any other fastening means, or merely by the threaded engagement between end members 120, 122 and shaft 142. The transducer FIG. 5 is particularly adapted to measure pressure drops across a valving member, orifice or the like wherein one face of the transducer 110 is suitably connected to a tube which is in fluid communication with the pressurized portion on one side of the valve, etc., while the other face of the transducer is connected to a tube which is in fluid communication with the other side of the valve, etc. The connection may be made in any suitable manner, as for example, with the connectors described above. As an alternative arrangement, the retaining members 144, 146 may be formed of a relatively frictionless bearing material to permit the shaft 142 to be freely slidable therein. In this situation, the armature member is fixed relative to the shaft 142 and the shaft-armature assembly is axially shifted in response to an increase or decrease in pressure.

Referring particularly to FIG. 4, a pressure responsive transducer device is illustrated as being connected in pressure responsive relation to a Bourdon tube type of pressure responder. It is to be understood that while the subject invention is illlstrated and described in conjunction with the Bourdon tube type responder, any type of pressure responder may be utilized to linearly actuate the shaft member 142. Thus, any type of transducer device which is capable of transforming bidirectional or unidirectional pressure into a linear motion may be utilized to actuate the shaft 142. It is to be understood that pressure is used generically to include both a positive and negative pressure, a pressure or vacuum, respectively.

The responder 170 generally comprises a tubular member 172 which is adapted to be attached to a line, the pressure of which is to be measured by means of a connector assembly 174. The other end of the tubular member 172 is interconnected with a stand assembly by means of a rigid fitting assembly 176 wherein the coupling 174 and fitting assembly 176 may take any form common in the art. The upper end of the rigid fitting assembly 176 is provided with a conventional Bourdon tube 180, which is generally of a C configuration having one end fixed to a block portion 182 forming a part of the stand assembly 176, and the other end 184 thereof, being interconnected with the longitudinally movable shaft 142 through a fixed linkage assembly 188. The Bourdon tube is of a type wherein the end 184 is moved outwardly of the transducer device 110 as the pressure increases and moves inwardly toward the transducer 110 as the pressure decreases. Similarly, in a vacuum situation, the greater the vacuum the more the displacement of the end 184 toward the transducer device 110.

Accordingly, the shaft member 142 is moved inwardly and outwardly with a decrease and increase in pressure, respectively, to thereby change the relative reluctance of the induction coils 114, 116 contained within the transducer device 110. The linkage assembly may be of any type, and is representatively illustrated as comprising a plate member 190 which is welded or otherwise rigidly fastened to the end 184 of tube 180 and a central portion of the plate member 190 is similarly welded or otherwise fixed to the end of the elongated shaft 142. Accordingly, the up and down motion of the end 184 is transmitted to the shaft member 142 through the linkage assembly 188. The interior of the transducer 110 may take a similar form to that illustrated in FIG. 5 with the exception that the springs 128, 130 and the end members 120, 122 are eliminated to reduce the opposition to the movement of shaft 142. Also, armature member 118 is fixed relative to shaft 142 and shaft 142 is extended at one end thereof to permit the attachment of the linkage assembly 188. In the situation where a large force is developed for a given change in pressure, it may be desirable to retain springs 128, 130 and end members 120, 122 to increase the range of the transducer 110.

While certain prior art systems utilize circuitry which is capable of measuring the variation of impedance of a position sensing winding. The indication system of the present invention incorporates a sensing circuit which provides an output signal in accordance with the ratio of impedances of the plurality of windings on the body member. Thus, a variation in impedance of the sensing coils in response to temperature change and the like, will not vary the output signal indicative of the position of the armature within the bore. Also, the indication system of the present invention utilizes a rectified voltage doubler circuit which provides the measuring art with a highly responsive direct current signal derived from an alternating current source, the direct current signal being of sufficient magnitude to actuate an indicating device, as for example a galvanometer, or the like.

Referring now to FIG. 6, there is illustrated a representative embodiment of an indicating circuit which is adapted to be utilized in conjunction with the transducer device described in conjunction with FIGS. 1 to 5. Particularly, the indicating circuit is provided with an input source of power by means of a plug 202 which is adapted to be interconnected with a suitable source of alternating current, as for example, 115 volt AC. The plug is connected through a pair of switches 204, 206 to a constant voltage or voltage regulated transformer 208, which includes a primary winding 210, a secondary winding 212 and a core member 214. The transformer 208 may be of the type such as that sold under the trade name "Sola Transformer."

The output of the transformer 208 is fed through a pair of conductors 218, 220 to a transducer circuit 222, the transducer circuit consisting of a pair of series connected inductor windings 224, 226. The inductor windings 224, 226 correspond to the windings 34, 36 of FIG. 2 or 114, 116 of FIG. 5, and both windings are chosen to have generally the same electrical and magnetic characteristics. The windings 224, 226 are magnetically coupled to a magnetic armature member 230 which is positioned in flux coupling relation to both of the windings 224, 226. The magnetic member 230 is a schematic representation of the variable magnetic circuit of FIGS. 2 and 5 caused by the bidirectional movement of the armature 52 and 118, respectively. The armature 230 is adapted to be moved linearly in a direction parallel to the axis of the coils 224, 226. Accordingly, when the armature member 230 is moved downwardly, the impedance of the winding 224 is lowered and the impedance of the winding 226 is correspondingly raised.

It is to be noted that a constant voltage is impressed across conductors 218, 220, thereby presenting a constant voltage across the series combination of the windings 224, 226. Thus, the drop across each of the windings 224, 226 will be a proportionate share of the total voltage present across conductors 218, 220, and is representative of the relative movement of the armature member 230 across the magnetic path of each of the windings. The voltage across conductors 218, 220, is also fed to a first balanced voltage divider circuit 234, utilized when the voltage at conductor 218 is positive with respect to conductor 220, a second balanced voltage divider circuit 236, which is adapted to be utilized when the voltage at conductor 218 is negative with respect to conductor 220, and a voltage doubler bridge circuit 240, which is adapted to provide an indication of the flow or pressure within the system.

The balanced voltage divider circuit 234 includes provisions for varying the output voltage thereof in such a manner such that the voltage across conductors 218 and 220 is exactly halved at the output terminal thereof.

Similarly, the second balanced voltage divider circuit 236 also includes provisions for dividing the voltage between conductors 218, 220 and presenting this divided voltage as an output signal. The voltage doubler bridge circuit 240 includes means for reversing the polarity of the indicating circuit and also further includes means for adjusting the span of the indicating device contained therein to provide a full scale deflection at the maximum flow of pressure which is anticipated.

Referring to the first balanced voltage divider circuit 234, the voltage across conductors 218, 220 is fed through a diode 250, a first relatively low impedance resistor 252, a second relatively low impedance resistor 254, and a second diode 256 all connected in series between conductors 218 and 220. A variable impedance, potentiometer circuit is connected across the series combination of resistors 252, 254 and generally comprises a slider 268, a potentiometer arm resistor 260 and a potentiometer resistor 262. In the circuit of the present invention, it is desired to provide a voltage at a node 264 between resistors 252 and 254 which is half the voltage between conductors 218 and 220. Accordingly, the slider potentiometer, including resistors 260, 262, may be varied to vary the resistance of the combination of resistors 252, 260 and the upper portion of resistor 262 as compared to the combination of resistors 254, 260 and the lower portion of 262. Thus, the voltage at node 264 may be varied by varying the position of the slider 268 with respect to the resistor 262.

The second balanced voltage divider circuit 236 is similar connected with a pair of diodes 270, 272 connected in series with a pair of resistors 274, 276, the resistors 274, 276 and diodes 270, 272 being connected across the conductors 218, 220. The second voltage divider circuit has been illustrated with fixed resistors 274, 276 to set the voltage at a node 290 with respect to the conductor 220. Accordingly, the voltage divider circuit 234, and particularly the zero resistor 262 is utilized to balance the voltage at node 264 to that of node 290. However, a second balancing or zero circuit may be incorporated into divider circuit 236 to provide additional adjustment of the voltage at nodes 264, 290. Accordingly, the voltage at node 290 will be approximately half the voltage across conductors 218 and 220.

The output voltages at nodes 264 and 290 are fed to opposite points of the bridge circuit 240 and a center tap conductor 294 is connected to an upper node 296 of the bridge 240, the other end of which being connected to a node 292 between the inductors 224 and 226. A first capacitor 300 is connected between nodes 264 and 296 and a second capacitor 302 is connected between nodes 290 and 296. Thus the voltage across capacitors 300 and 302 will vary in accordance with the difference in potential between the voltage at nodes 264 and 296 in the case of capacitor 300 and the difference in voltage between nodes 290 and 296 in the case of capacitor 302, as will be more fully explained in conjunction with the description of the operation of the circuit.

A galvanometer type indicating device 306 is connected at one end thereof to a first reversing switch 308 and through a variable span impedance 310 to the node 264 and the other end of the indicating device 306 is connected to node 290 through a second reversing switch 314 and a conductor 316. The span impedance 310 is made variable to vary the amount of current being fed to the indicating device to provide a full scale deflection for the maximum amount of flow or pressure which is anticipated, thereby providing a calibration means for the indicating device in accordance with the anticipated rating of the system.

With the reversing switches 308, 314 in the opposite direction, or poled opposite to that shown, a circuit is completed from node 290 through a second span variable resistor 320, a terminal 322, the arm of a reversing switch 308, the indicating device 306, to the arm of the second reversing switch 314. With the arm of the reversing switch 314 in the opposite position, that is in contract with a second terminal 324, the indicating device 306 is connected to the node 264 through a conductor 328. Each of the resistors 310 and 320 have ben provided with a sliding resistors 330, 332 to vary the impedance of the resistors 310, 320 and also a pair of diodes 334, 336 have been connected in oppositely poled, shunt relation to the indicating device 306 to provide protection for the indicating device 306.

In operation and assuming that the reversing switches 308, 314 are in the position shown, the system is initially calibrated with zero flow through the meter. It is further assumed that the armature 230 has been exactly centered between the inductors 224 and 226 at a no-flow condition. Accordingly, the switches 204 and 206 are closed, thus applying a voltage between conductors 218 and 220 and for purposes of example, it is assumed that the voltage across conductors 218, 220 has been lowered to approximately 6 volts, alternating current, due to the step down transformer 208. For purposes of simplicity, the conversion between alternating current and direct current will be assumed to be equal and the three volt direct current potential at the nodes 264, 290 is assumed to be one-half of the potential across the conductors 218, 220.

Accordingly, a six volt potential is impressed across conductors 218, 220 and accordingly across the series combination of the diodes 250, 256 and the balanced voltage divider circuit 234 and similarly the series combination of diodes 270, 272 and the balanced voltage divider 236. It is to be understood that the voltage divider circuit 234 is utilized during what is assumed to be the positive half cycle or wherein conductor 218 is positive with respect to the conductor 220, and the voltage divider circuit 236 is utilized during the corresponding negative half cycle or when conductor 220 is positive as compared to conductor 218. Accordingly, with zero current flow through the meter, thereby permitting armature 230 to assume the null or zero position, the meter 306 should read zero due to the fact that the average pulsating DC voltage at node 264 is approximately three volts and the average pulsating DC voltage at node 290 is also approximately three volts. However, it is important to note that the voltages at nodes 264 and 290 are identical. If these voltages are not identical, the slider 268 may be correspondingly adjusted to vary the voltage at node 264 to thereby zero the meter indicating device 306.

With the circuit initially at rest and with the balanced voltage divider circuit 234 adjusted to the half way position wherein the voltages at nodes 264 and 290 are exactly equal, the switches 204 and 206 are closed, thereby permitting the first half wave to flow through the circuit. Accordingly, the upper end of inductor winding 224 is positive with respect to the center tap node 292 and the node 292 is positive with respect to the conductor 220, assuming that the armature device 230 has been sufficiently lowered to cause the lower inductor 226 to drop twice the amount of voltage available between conductors 218 and 220 as compared to the voltage dropped across inductor 224. Accordingly, the voltage across inductor 226 will be approximately four volts while the voltage across inductor 224 will be approximately two volts. The center tap voltage at node 292 will be at approximately four volts as compared to the six volts at conductor 218 when measured from conductor 220, and this four volt potential will be fed to node 296.

It has already been stated that the voltage at node 264 is at three volts thereby providing a one volt drop across capacitor 300 to charge the capacitor plus to minus in a direction between nodes 264 and 296 in accordance with the upper polarity illustrated in parenthesis on the drawing. The same four volt potential applied at node 296 is applied across capacitor 302. However, the diodes 270, 272 are back biased to preclude the charging of capacitor 302. However, on the second half cycle, the negative half cycle, the diodes 270 and 272 will be forwarded biased to establish a three volt potential at node 290 and the voltage at node 296 will assume a four volt potential with respect to the positive conductor 220. Accordingly, the four volt potential at node 292 is fed by means of conductor 294 to the node 296, and with the node 290 at three volt potential, the capacitor 302 will be charged to one volt, with the upper polarity illustrated in the drawing. Accordingly, the capacitors 300, 302 are charged at one volt each, in accordance with the polarity illustrated, by the first full wave cycle impressed on conductors 218, 220.

As is seen from the foregoing description, each of the capacitors 300, 302 is charged with the difference between the voltage at node 296 and each of nodes 264, 290. Accordingly, the sum of the voltages across capacitors 300, 302 is impressed across the meter 306 to provide an output reading which is indicative of the charge on the capacitors. It will be noted that the net voltage across the meter 306 is double the difference signal, thus providing the voltage doubling effect. The particular parameters chosen for each charging circuit are typically of a low impedance to provide the full difference signal across the capacitors. Contrariwise, the discharge circuit through the meter is of a high impedance to maintain a substantial portion of the charge on the capacitors, and any discharging will be resupplied on a subsequent cycle. In this way, the capacitors act as a transfer agent for the charge from the coils to the meter.

When the second positive half cycle is impressed on conductors 218, 220, the voltage at node 292 will again rise to a four volt potential as compared to the potential at conductor 220, this four volt potential being fed by conductor 294 to the node 296. Accordingly, with a four volt potential at node 292 and with the capacitor 302 charge negative to positive between nodes 290 and 296, current will flow from node 264, through resistor 310, slider 330 combination, reversing switch 308, indicating device 306, reversing switch 314, conductor 316, node 290, through a second one volt potential across capacitor 302 to node 296. It will be noted that upon the discharge of capacitor 302 due to the flow of current in the opposite direction through the capacitor, the capacitor 302 gives up its charge to provide the second volt potential, and the capacitor 302 is charged in an opposite direction, or plus to minus as current flows from node 290 to 296. This polarity is illustrated in parenthesis in the drawing. Accordingly, a two volt potential has been impressed across indicating meter 306, the two volt potential being double the difference between input nodes 296 and 264.

On the negative half cycle, the conductor 220 becomes positive and node 292 assumes a four volt potential, the four volt potential being fed to node 296 by means of conductor 294. With the four volt potential at node 296, current will flow from node 296 through capacitor 300, which is charged minus to plus, to add an additional volt to the signal, through node 264, resistor-slider arm combination 330, 310, reversing switch 308, indicating device 306, reversing switch 314, conductor 316 to node 290, which is at a three volt potential or one volt less than the potential at node 296. Accordingly, a second two volt potential is presented to indicating device 306 and the current flow therethrough is in the same direction as was the current flow through the indicating device during the positive half cycle. This operation is continued thereby giving a constant output indication at meter 306 until such time as the armature 230 is moved to a new position.

It will be noted from the above discussion that each cycle of current flow is through resistor 310, slider arm 330 combination. Accordingly, the maximum flow, which is desired to be measured by the system illustrated, may be passed through or the maximum pressure may be impressed on the transducer device 222, thereby moving the slug or armature 230 to its maximum deflection position. Accordingly, with maximum flow or pressure being impressed on the armature member 230, the effective resistance presented by resistor 310, slider 330 combination to the flow of current through the meter may be adjusted such that the meter will provide maximum deflection for maximum movement of the armature member 230. Accordingly, if the meter is reading below the maximum, the effective resistance of the span resistor 310 may be decreased and contrariswise, if the meter is reading high, the effective resistance of the span resistor 310 may be increased.

As was stated above, the reversing switches 310, 314 have been provided in the event a reverse flow or pressure is impressed on the armature device 230. Accordingly, if the armature is moved in a direction opposite to that described above, the switches 308, 314 are reversed whereby the armatures are in contact with the terminals 322 and 324. In the event it is desired to calibrate the indicating circuit in the reverse direction, the reversing switches are switched into contact with terminals 322 and 324 and the effective resistance of the span resistor 320 is adjusted to give maximum flow of maximum deflection of the meter 306 for maximum movement of the armature member 230. It will be noted that the current will flow through the meter in the same direction for the opposite flow or pressure in the same direction as did current flow through the meter 306 in the direction described above.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A bidirectional transducer for converting a varying characteristic of a fluid in a system into an indicating signal comprising a housing member having a central bore therein, said bore having a constricting means on the interior surface of the bore formed as a bore knife edge, said bore knife edge being formed by oppositely converging surfaces within the bore and having a minimal surface parallel to the axis of said bore at the point of convergence, an armature member having a mating knife edge concentrically supported in said bore and axially movable relative thereto in first and second opposite axial directions in response to the characteristic, said mating knife edge being formed by oppositely converging surfaces and having a minimal surface parallel to the axis of said bore, first and second end members concentrically supported within said bore and mechanical resilient biasing means for substantially centering said armature member axially with respect to said first and second end members, wherein said mechanical resilient biasing means includes means for increasing the effective range of the transducer including first spring means positioned between said armature and said first end member for exerting a biasing bore on said armature in a first direction when said armature is displaced from said centered position and a second spring means positioned between said armature and said second end member for exerting a biasing force on said armature in a second direction opposite to said first direction when said armature member is displaced from said centered position, said biasing means having an effective spring rate which is greater than the spring rate of said first or second spring means, said armature and said constricting means forming a variable flow area which varies in response to changes in the characteristic, said constricting means and said armature having an external configuration to vary the axial movement of the armature in accordance with a predetermined function of the characteristic as determined by the coaction of said armature and said constricting means.

2. A bidirectional transducer for converting a varying characteristic of a fluid in a system into an indicating signal comprising a housing member having a central bore therein, a magnetic armature member concentrically supported in said bore and axially movable relative thereto in first and second axial directions in response to an increase and decrease in the characteristic, first and second end members concentrically supported within said bore and normally axially spaced from said armature member, and mechanical resilient biasing means for increasing the effective range of the transducer and substantially centering said armature member axially with respect to said first and second end members including first spring means positioned between said armature and said first end member for exerting a biasing force on said armature in a first direction when said armature member is displaced from said centered position and a second spring means positioned between said armature and said second end member for exerting a biasing force on said armature in a second direction opposite to said first direction when said armature member is displaced from said centered position, said biasing means having an effective spring rate which is greater than the spring rate of at least one of said first and second spring means.

3. A bidirectional transducer for converting a varying characteristic of a fluid in a system into an indicating signal comprising a housing member having a central bore therein, said central bore having constricting means formed therein forming a knife edge for constricting the effective flow area of said bore, a magnetic armature member concentrically supported in said bore and axially movable relative thereto in first and second axial directions in response to an increase and decrease in the characteristic having projecting means formed thereon in the shape of a second knife edge, first and second end members concentrically supported within said bore and normally axially spaced from said armature member, and mechanical resilient biasing means for increasing the effective range of the transducer and substantially centering said armature member axially to position said knife edges contiguously including first spring means positioned between said armature and said first end member for exerting a biasing force on said armature in a first direction when said armature member is displaced from said centered position and a second spring means positioned between said armature and said second end member for exerting a biasing force on said armature in a second direction opposite to said first direction when said armature member is displaced from said centered position, said biasing means having an effective spring rate which is greater than the spring rate of at least one of said first and second spring means.

4. A bidirectional transducer for converting a varying chracteristic of a fluid in a system into an indicating signal comprising a housing member having a central bore therein, said bore having a first and second counterbored portion at either end thereof, a magnetic armature member concentrically supported in said bore and axially movable relative thereto in first and second axial directions in response to an increase and decrease in the characteristic, first and second end members concentrically supported within said counterbored portions and normally axially spaced from said armature member, shaft means slidably supporting said armature member for relative axial movement thereof, said end members having a hub portion including a hub bore, said bore having a counterbored portion closely fitting the exterior surface of said shaft means for radially centering said shaft means within said central bore, and mechanical resilient biasing means for increasing the effective range of the transducer and substantially centering said armature member axially with respect to said first and second end members including first spring means positioned between said armature and said first end member for exerting a biasing force on said armature in a first direction when said armature member is displaced from said centered position, and a second spring means positioned between said armature and said second end member for exerting a biasing force on said armature in a second direction opposite to said first direction when said armature member is displaced from said centered position, said biasing means having an effective spring rate which is greater than the spring rate of said first or second spring means.

5. A bidirectional transducer for converting a varying characteristic of a fluid in a system into an indicating signal comprising a housing member having a bore therein, a movable armature member supported in said bore and axially movable relative thereto in first and second axial directions in response to a change in the characteristic, and mechanical resilient biasing means for positioning said armature member axially within said bore, said armature member forming a variable orifice with said bore, which varies as a function of changes in the characteristic, said biasing means including first and second spring means acting oppositely on said armature tending to center said armature, said biasing means having an effective spring rate which is greater than the spring rate of said first or second spring means.

6. The transducer of claim 5 wherein said orifice varies as a linear function of changes in the characteristic.

7. The transducer of claim 5 wherein said orifice varies exponentially with changes in the characteristic.

8. The transducer of claim 5 further including first and second series connected flux producing coils mounted on the housing and said armature member being supported in the flux path of the flux coils and relatively movable with respect thereto in response to the varying characteristic, the movement of the armature in one direction increasing the reluctance of said first coil flux path and correspondingly decreasing the reluctance of said second coil flux path, the improvement comprising energy means for energizing the first and second coils with a source of alternating current potential and producing a voltage drop across each of said first and second coils in accordance with the position of the armature means, first rectifying voltage divider means connected to said energy means for producing a first unidirectional reference from a first half wave of the alternating current potential, second rectifying voltage divider means connected to said energy means for producing a second unidirectional reference voltage from a second half wave of the alternating current potential, and means for doubling the magnitude of a first signal comprising the difference in voltage between the voltage drop across said first coil during the first half wave and said first reference signal and a second signal comprising the difference in voltage between the voltage drop across said second coil during the second half wave and said second reference signal and indicating means responsive to the successive first and second doubled signals for indicating the fluid characteristic.

9. The transducer of claim 5 further including a coupling flanged nipple for coupling a pressurized fluid line with the housing member for inserting the housing member into the fluid line, the assembly having an interior threaded bore and the fluid line having a first flange member at an end thereof comprising an elongated body portion having one end thereof exteriorly threaded to mate with the threaded bore, a central portion of a first diameter and a head portion having a second diameter greater than said first diameter, and a second flange member having a central bore of a diameter to closely fit said first diameter and slidably supported on said central portion, said second flange member being adapted to be connected to the first flange member to connect the fluid line to the housing member.

10. The transducer of claim 8 further including a coupling flanged nipple for coupling a pressurized fluid line with the housing member for inserting the housing member into the fluid line, the assembly having an interior threaded bore and the fluid line having a first flange member at an end thereof comprising an elongated body portion having one end thereof exteriorly threaded to mate with the threaded bore, a central portion of a first diameter and a head portion having a second diameter greater than said first diameter, and a second flange member having a central bore of a diameter to closely fit said first diameter and slidably supported on said central portion, said second flange member being adapted to be connected to the first flange member to connect the fluid line to the housing member.

References Cited
UNITED STATES PATENTS

| | | | |
|---|---|---|---|
| 599,746 | 3/1898 | St. John | 73—210 |
| 1,917,974 | 7/1933 | Inglis et al. | |
| 2,364,930 | 12/1944 | Turner | 336—136 X |
| 2,417,097 | 3/1947 | Warshaw | 336—136 X |
| 2,494,579 | 1/1950 | Pimlott et al. | 336—136 X |
| 2,630,559 | 3/1953 | Whittier. | |
| 2,549,567 | 4/1951 | Berman | 336—136 X |
| 2,769,337 | 11/1956 | Rich | 73—228 X |
| 3,247,499 | 4/1966 | Dumpleton et al. | 73—205 X |
| 2,574,866 | 11/1951 | Fahrlander | 73—210 |

FOREIGN PATENTS 341,786  10/1921  Germany.

OTHER REFERENCES

"Flow-rate Indicator," Instruments, vol. 19, p. 224.

RICHARD C. QUEISSER, Primary Examiner

J. K. LUNSFORD, Assistant Examiner

U.S. Cl. X.R.

73—194, 207